US011988019B2

(12) United States Patent
Housley

(10) Patent No.: US 11,988,019 B2
(45) Date of Patent: May 21, 2024

(54) DRAWER LOCK DEVICE

(71) Applicant: William Housley, Orland, CA (US)

(72) Inventor: William Housley, Orland, CA (US)

( * ) Notice: Subject to any disclaimer, the term of this patent is extended or adjusted under 35 U.S.C. 154(b) by 366 days.

(21) Appl. No.: 17/524,483

(22) Filed: Nov. 11, 2021

(65) Prior Publication Data

US 2023/0146303 A1 May 11, 2023

(51) Int. Cl.
*E05B 27/00* (2006.01)

(52) U.S. Cl.
CPC ................................ *E05B 27/0057* (2013.01)

(58) Field of Classification Search
CPC ............. E05B 19/0017; E05B 19/0052; E05B 19/0058; E05B 27/10; E05B 65/44; E05B 65/46
See application file for complete search history.

(56) References Cited

U.S. PATENT DOCUMENTS

| | | | | |
|---|---|---|---|---|
| 10,119,299 B1 * | 11/2018 | Wu | E05B 27/0032 | |
| 2010/0199731 A1 * | 8/2010 | Kofman | E05B 35/003 | 70/358 |
| 2011/0154871 A1 * | 6/2011 | Huang | E05B 27/0057 | 70/375 |
| 2011/0271724 A1 * | 11/2011 | Huang | E05B 27/00 | 70/493 |
| 2023/0038968 A1 * | 2/2023 | Magill | E05B 27/0017 | |

FOREIGN PATENT DOCUMENTS

| | | | |
|---|---|---|---|
| CN | 109138638 A * | 1/2019 | E05B 19/00 |

* cited by examiner

*Primary Examiner* — Christine M Mills
*Assistant Examiner* — Christopher F Callahan
(74) *Attorney, Agent, or Firm* — My Patent Guys; Christopher Pilling

(57) ABSTRACT

An anti-lock picking lock device is provided. The lock device features a locking cylinder having an opening configured to receive a drawer. The drawer having a keyway slot on its top surface and is configured to receive a similar shaped key. The drawer is enabled to slide within the clocking cylinder during use. In one position, the keyway slot is not exposed and occluded from any type of tampering. In another positon, the drawer is extended, either manually or via an electronic device, making the keyway slot accessible for operation.

6 Claims, 3 Drawing Sheets

DRAWER LOCK DEVICE

CROSS-REFERENCE TO RELATED APPLICATIONS

N/A

BACKGROUND OF THE INVENTION

1. Field of the Invention

The present invention relates generally to locks but more particularly to a drawer locking system configured to prevent lock picking.

2. Description of Related Art

Lock picking is the practice of unlocking a lock by manipulating the components of a lock device without the original key. As lock picking skills and techniques increase, anti-lock picking methods are critical in preventing unauthorized entry. Consequently, the present invention provides a drawer lock device configured to prevent lock-picking.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

It is an object of the invention to provide an anti-lock picking lock device that cannot be opened using traditional lock picking methods.

In order do to so, a lock device is provided, comprising a locking cylinder having an opening configured to receive a drawer, the drawer having a top side, a bottom side, a rear side, and a front side, wherein the drawer comprises a keyway slot on the top side; the drawer configured to slide within the opening between a first position to a second position, the first position defined as the drawer substantially within the opening such that the keyway slot is not accessible, the second position defined as the drawer substantially extended from the opening such that the keyway slot is accessible; and a key configured to be removably positioned within the keyway slot such that when the key is positioned within the keyway slot and the drawer is in the first position a plurality of security pins are aligned allowing the locking cylinder to rotate.

In one embodiment, the key is sized and shaped to fit completely within the keyway slot. In one embodiment, the key includes a top surface and when the key is positioned within the keyway slot the top surface is approximately flush with the top side of the drawer. In one embodiment, the keyway slot is between the rear side and the front side of the drawer and does not extend to the front side, such that the keyway slot is occluded when the drawer is in the first position. In one embodiment, the drawer includes a handle position on approximate to the front side, the handle enabling a user to extend the drawer from the locking cylinder from the first position to the second position to expose the keyway slot. In another embodiment, the drawer is configured to be extended from the locking cylinder from a first position to a second position via a short range wireless transmission signal from an external electronic device. In yet another embodiment, a housing is provided configured to retain the locking cylinder and prevent the locking cylinder from rotating until key is positioned in the keyway slot and the drawer is in the first position.

The foregoing has outlined rather broadly the more pertinent and important features of the present disclosure so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE PREFERRED EMBODIMENT

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide a drawer lock device.

It is to be understood that the terminology used herein is for the purpose of describing particular embodiments only and is not intended to be limiting. The terms “a” or “an,” as used herein, are defined as to mean “at least one”. The term “plurality,” as used herein, is defined as two or more. The term “another,” as used herein, is defined as at least a second or more. The terms “including” and/or “having,” as used herein, are defined as comprising (i.e., open language). The term “providing” is defined herein in its broadest sense, e.g., bringing/coming into physical existence, making available, and/or supplying to someone or something, in whole or in multiple parts at once or over a period of time. As used herein, the terms “about”, “approximately”, or “substantially” apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In other instances, these terms refer to positions or descriptions of referenced limitations of components.

Figure 1:
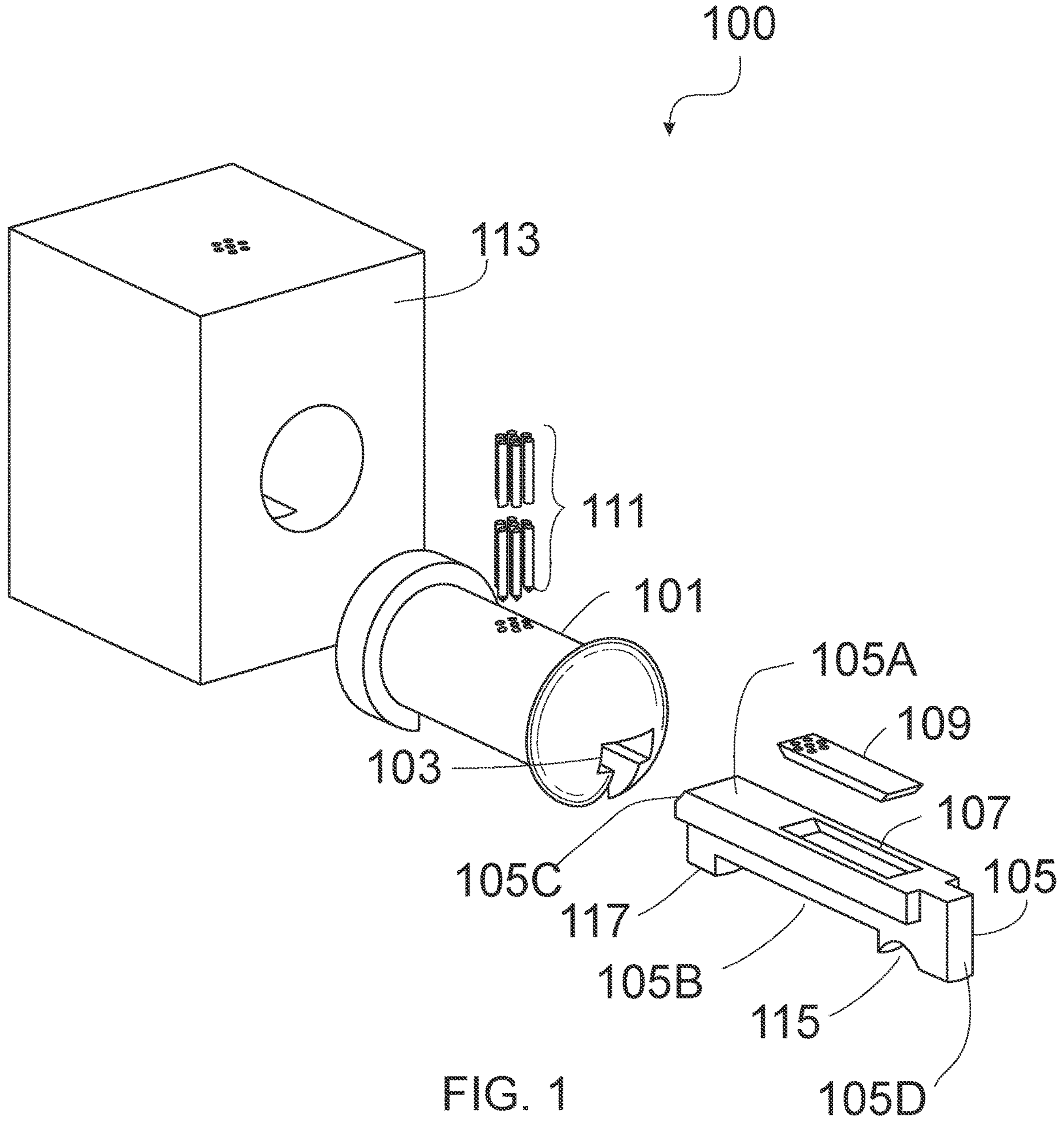
FIG. 1 is an exploded view of a drawer lock device according to an embodiment of the present invention.

FIG. 1 is an exploded view of a drawer lock device 100 according to an embodiment of the present invention. Referring now to FIGS. 1, the drawer lock device 100 is illustrated. In one embodiment, the lock device 100 comprises a locking cylinder 101 cylinder having an opening 103 configured to receive a drawer 105, the drawer having a top side 105A, a bottom side 105B, a rear side 105C, and a front side 105D. In one embodiment, the drawer comprises a keyway slot 107 on the top side. In one embodiment, the keyway slot is positioned centrally between the front side 105D and the rear side 105C on the top side 105A of the drawer. The position of keyway slot 107 prevents unauthorized access and tampering, as the keyway slot 107 does not extend to the front side 105 D of the drawer 105 or the rear side 105C of the drawer 105. That is, the keyway slot 107 is occluded from a lock picker by the front side 105D of the drawer. This will be described in greater details below.

A key 109 is sized and shaped to be removably positioned within the keyway slot 107 is provided. The keyway slot may vary in appearance, but should substantially match the key and vice versa. In one embodiment, when the key 109 is positioned within the keyway slot 107, the top surface of the key should be flush or approximately flush with the top surface of the top side 105A.

The locking device 100 of the present invention is configured to use a common pin tumbler lock mechanism with the use of a plurality of security pins 111 that need to be aligned to a shear point or shear line as well known in the art. The plurality of security pins may be of varying length, and may include springs and other components well known in the art of pin tumbler lock mechanisms. In some embodiments, the security pins are contained within the locking cylinder 101. In other embodiments, the security pins 111 and locking cylinder 101 are housed and retained in a housing 113 configured to hold on the components of the lock device 100, and specifically the locking cylinder 101. Pin holes may be provided through the top surface of the locking cylinder to allow the security pins to access the opening and keyway slot. The alignment of the security pins occurs when a key 109, produced for this specific lock, is placed within the keyway slot 107. The key may include dimples, pin holes, or other shapes configured to align the security pins.

Figure 2:
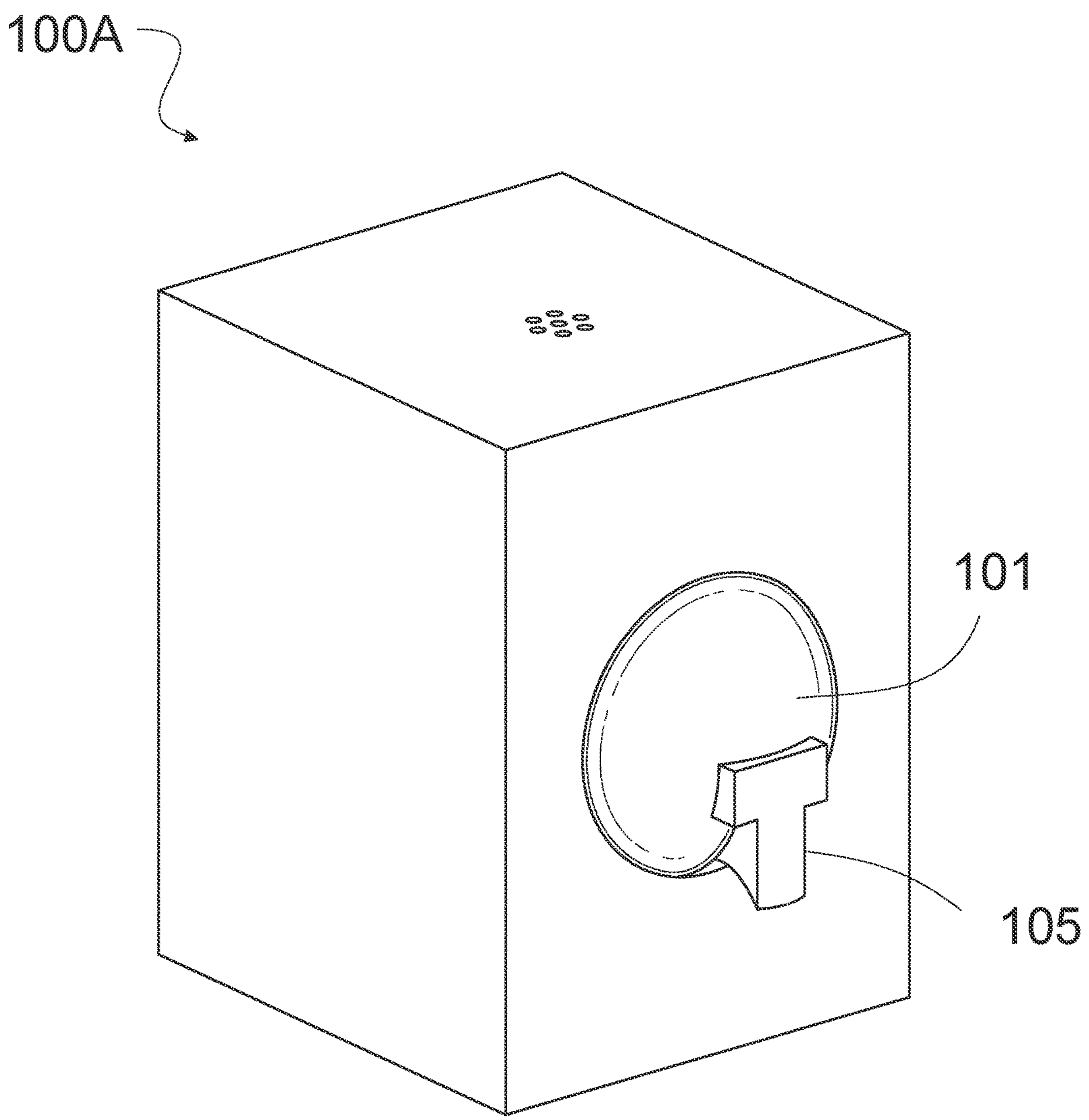
FIG. 2 is a perspective view of the drawer lock device according to an embodiment of the present invention.

In one embodiment, the shape of the bottom of the locking cylinder 101 prevents the locking cylinder from rotating within the housing, wherein the prevention is from a protruding element either on the locking cylinder and/or within the housing to prevents rotational movement of the locking cylinder until two things occur: (a) a key 109 is positioned in the keyway slot 107 and (b) the drawer 105 is in a first position (100A; FIG. 2). The locking cylinder is prevented from lateral and linear movement within the housing.

It should be understood, that the housing 113 is only a representation of a locking component configured to hold the locking cylinder, security pins, dead bolt, and other necessary components for the lock device that may not be explicitly described herein. It may be shaped differently or be formed within the element for which the locking device (and locking cylinder) is installed, such as a door or safe. The purpose of this invention and disclosure is to allow someone skilled in the art of lock making to carry out the invention, as the details of the locking mechanism outside of this disclosure are considered known and not necessary for one skilled in the art for one to carry out the invention.

Figure 3:
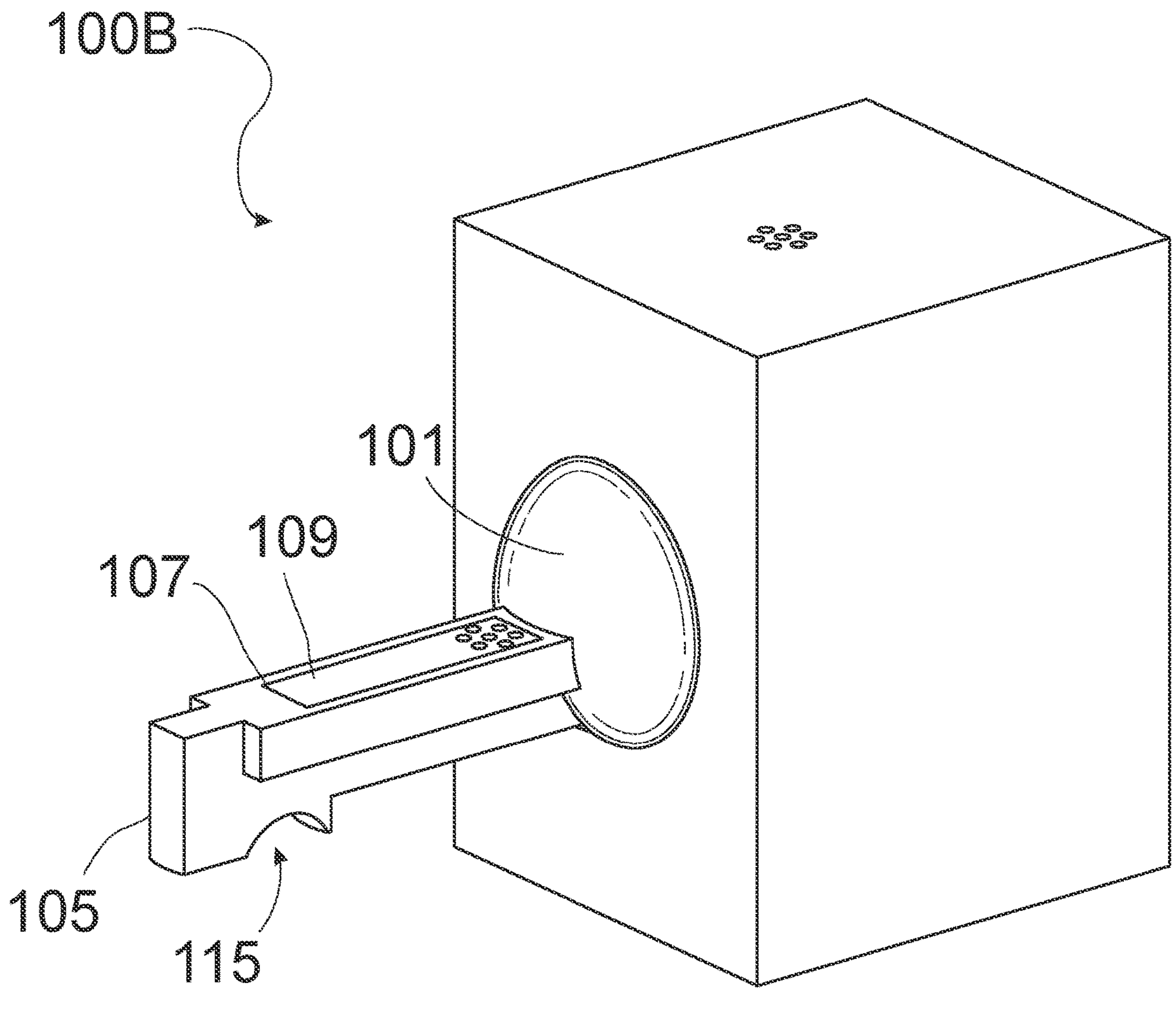
FIG. 3 is a perspective view of the drawer lock device with the drawer extended according to an embodiment of the present invention.

Referring now to FIGS. 2-3, in one embodiment, the drawer 105 is configured to slide within the opening 103 between a first position 100A (FIG. 2) to a second position 100B (FIG. 3). Advantageously, the keyway slot 107 is positioned such that the keyway slot 107 is not accessible when the drawer 105 is in the first position 100A. Similarly, the opening 103 is not accessible nor the plurality of security pins 111, so any tampering with the components within the locking cylinder is not possible. Even when the drawer 105 is extended into the second position 100B, due to the position of the keyway slot 107, the plurality of security pins 111 are inaccessible with modern tools and techniques. That is, due to the shape and dimensions of the front and rear of the top side of the drawer, the security pins are never exposed through the keyway slot. Even still, if the plurality of security pins were managed to be tampered with such that the plurality of security pins were aligned (replicating the key), the drawer and locking cylinder is not able to rotate until the drawer is in the first position 100A. Thus, it is impossible to pick the lock device of the present invention.

In some embodiments, the drawer 105 is prevented from fully extending out of the opening 103 of the locking cylinder 101. Material, such as 117 (FIG. 1) may be provided on the bottom side 105B at the rear side 105C of the drawer 105 to prevent the drawer 105 from extending too far. In other embodiments, the drawer is captive in the opening 103 of the locking cylinder 101 by other methods, such as an interrupted thread or screw on the rear side of the drawer 105. In some embodiments, the drawer 105 is spring loaded such that the drawer is configured to be biased in the first position 100A.

There may be a variety of methods to extend the locking cylinder 101 to a second position 100B form the first position 100A. In one embodiment, the drawer 105 includes a handle 115 position on approximate to the front side 105D, the handle 115 enabling a user to extend the drawer from the locking cylinder from the first position 100A to the second position 100B to expose the keyway slot 107. In other embodiments, the drawer 105 is configured to be extended from the locking cylinder 101 from a first position 100A to a second position 100B via a short range wireless transmission signal from an external electronic device, where in the wireless transmission signal is a Bluetooth signal, magnetic field, radio frequency, Infrared, or similar, via a smartphone, key fob, RFID card, remote, or similar. Likewise, the transmission signal may be over long distances via the Internet. In these embodiments, the handle may not be provided, providing a two-stage system for added protection, requiring the device to extend the drawer and the key to activate and unlock the locking mechanism.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. A lock device comprising:

a locking cylinder having an opening configured to receive a drawer, the drawer having a top side, a bottom side, a rear side, and a front side, wherein the drawer comprises a keyway slot on the top side, wherein the keyway slot is not accessible from the front side of the drawer;

the drawer configured to slide within the opening between a first position to a second position, the first position defined as the drawer substantially within the opening such that the keyway slot is not accessible, the second position defined as the drawer substantially extended from the opening such that the keyway slot is accessible;

a key configured to be removably positioned within the keyway slot such that when the key is positioned within the keyway slot and the drawer is in the first position a plurality of security pins are aligned allowing the locking cylinder to rotate;

the drawer configured to be positioned within the opening of the locking cylinder such that there is no access to the opening of the locking cylinder when the key is not positioned in the keyway slot thereby blocking any access to the plurality of security pins in both the first position and second position or any position in between the first or second position; and the drawer configured such that the locking cylinder cannot rotate unless the drawer is in the first position.

2. The lock device of claim 1, wherein the key is sized and shaped to fit completely within the keyway slot.

3. The lock device of claim 2, wherein the key includes a top surface and when the key is positioned within the keyway slot the top surface is approximately flush with the top side of the drawer.

4. The lock device of claim 1, wherein the keyway slot is between the rear side and the front side of the drawer and does not extend to the front side, such that the keyway slot is occluded when the drawer is in the first position.

5. The lock device of claim 1, wherein the drawer includes a handle position on approximate to the front side, the handle enabling a user to extend the drawer from the locking cylinder from the first position to the second position to expose the keyway slot.

6. The lock device of claim 1, further comprising a housing configured to retain the locking cylinder and prevent the locking cylinder from rotating until key is positioned in the keyway slot and the drawer is in the first position.

* * * * *